Nov. 8, 1966  J. F. ALARIE  3,284,128

FOLDABLE CAMPING TRAILER

Filed July 28, 1964

INVENTOR.
JOSEPH F. ALARIE.
BY *Joseph F. Alarie.*

United States Patent Office 3,284,128
Patented Nov. 8, 1966

3,284,128
FOLDABLE CAMPING TRAILER
Joseph F. Alarie, 4780 NW. 2nd St., Miami, Fla.
Filed July 28, 1964, Ser. No. 385,634
2 Claims. (Cl. 296—23)

This information pertains to a camping trailer; and, more particularly, to a foldable camping trailer adapted to expand in a vertical, as well as a horizontal, direction. Conventional folding trailers customarily expand by folding or telescoping vertically, thus providing head room, but no increase in floor area. Others are expanded by the use of a conventional tent erected adjacent to and/or over them. It is well known that it is both bothersome and time consuming, especially in inclement weather, to erect a tent, and it requires a great deal of skill to do so without exposing the interior to the elements.

The trailer contemplated by this invention expands by utilizing the entire body structure as a shelter resting on the ground in the form of an A-structure and, by the automatic erection of a collapsible shelter on the trailer undercarriage, in that position previously occupied by the body. The body assembly is adapted to be locked in the closed position, and is automatically raised by a spring action when the latching means is released.

It is therefore an object of this invention to provide a novel folding or expandable trailer that may be unfolded or closed quickly and easily, without exposing the interior.

It is another object of this invention to provide a novel folding trailer, the body of which, is adapted to be disposed on the ground and expanded to serve as a shelter.

Another object of this invention, is to provide a novel folding trailer, comprising a second shelter adapted to be erected automatically.

It is yet another object of this invention to provide a novel folding trailer spring raised to an open position and, having a locking mechanism for holding it in closed position.

It is a more particular object of this invention, to provide a novel folding trailer adapted to be expanded into two full-sized rooms, having hinged means for pivoting, and guiding the parts of the trailer during opening operation, having spring means for raising said trailer to an expanded position, and having latch means for locking said trailer in closed position.

With these and other objects in view, the invention consists in the construction and novel combination and arrangement of parts, hereinafter fully described and illustrated in the accompanying drawings forming a part of this specification, in which.

Figure 1:
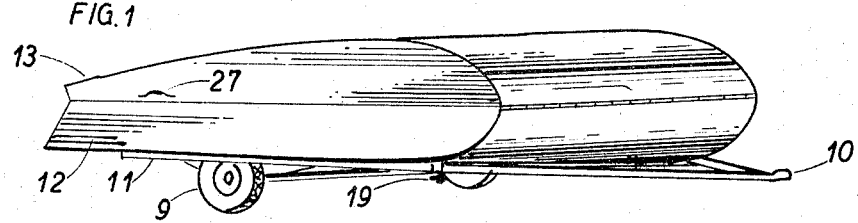
FIG. 1 is a perspective view of a trailer embodying the invention in its folded position.

Referring to the drawings, a preferred form of the invention is embodied in a trailer, having a pair of wheels 9 supported in any conventional manner from a frame 8, the forward end of which forms a tongue 10, which may be provided with a coupling, for the connection to a hitch on an automobile.

The principal parts of the structure are: a two part body structure or container 12 and 13, base panel 11, fabric panels 14, 15 and 16, and collapsible shelter 17 with supporting rib 18.

Figure 2:
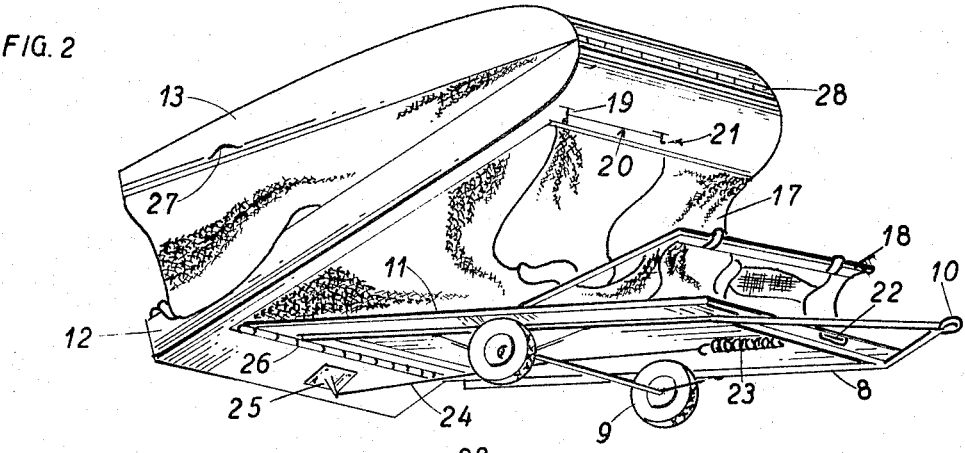
FIG. 2 is a perspective view of the trailer in a partially unfolded position.

Base panel 11 is adapted to ride on trailer chassis 8 (FIG. 2). Container 12 is adapted to ride on base panel 11, as in FIG. 1. Container top 13 is hinge mounted to container 12, and seals it when in the closed position. Fabric panels 14, 15 and 16 (FIG. 3) are adapted to interconnect container halves 12 and 13, and serve as closure panels for the shelter area when the trailer is expanded as in FIG. 3. Collapsible shelter 17 and its supporting rib 18 (FIG. 3) are mounted on base panel 11, nested inside container 12 through opening 30 (FIG. 3) when the trailer is in the folded condition, and adapted to erect automatically as the trailer is expanded.

From the folded position of FIG. 1, container halves 12 and 13 and collapsible shelter 17 (FIG. 2) is adapted to raise to a partially erected position, as explained more fully later.

Figure 3:
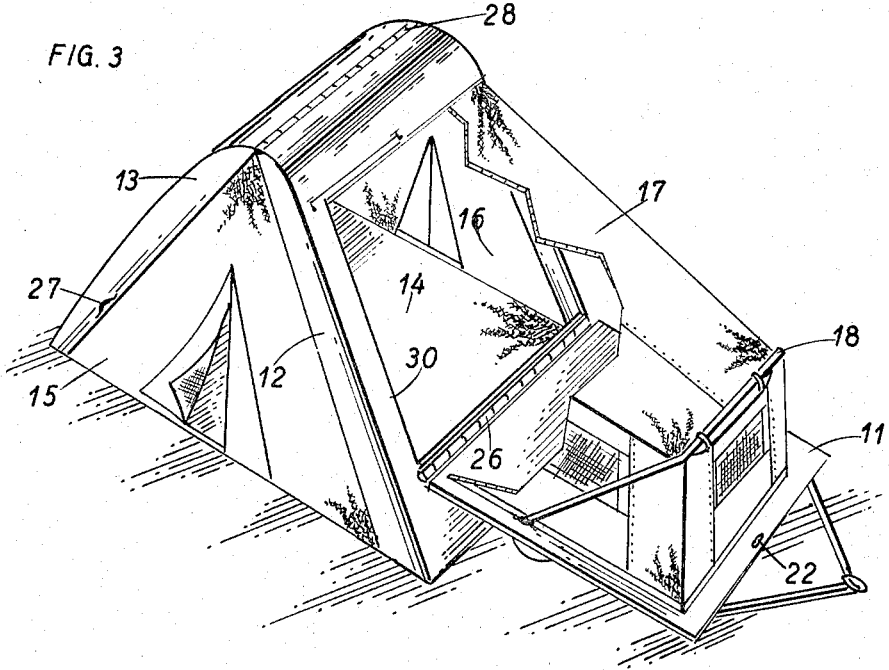
FIG. 3 is a cut-away view of the trailer in the fully expanded position, showing a portion of the interior of both shelters.

To expand the trailer from the travel position of FIG. 1 to the fully expanded or camping position of FIG. 3 (referring first to FIG. 2), lever 19 is manually pulled, displacing rod 20, which in turn releases latch 21 from slot 22. Spring 23, applying force to container 12 through cable 24 and strut 25, causes container halves 12 and 13 to raise, pivoting on hinge 26, thus pulling collapsible shelter 17 to a partially erected position, as in FIG. 2. A manual pulling force must now be applied to handle 27 in a rearward direction, causing container 12 to rotate upward and rearward, until stopped by folding shelter 17, when it reaches its full expanded position as in FIG. 3. Further pulling on handle 27 causes container 12 and container top 13 to operate, pivoting on hinge 28 until action is stopped by fabric panels 15 and 16 as in FIG. 3.

Fabric panel 14 (FIG. 3) serves as a floor, when the trailer is in the expanded position. Fabric panels 15 and 16 form the end walls of the shelter as in FIG. 3, and are equipped with conventional tent type openings for ventilation and egress.

There has thus been provided a novel foldable trailer, adapted to fold into a closed position which is compact and low, permitting unobstructed visibility behind the towing vehicle, but which opens to provide a spacious living area on the ground, as well as a large sleeping area above the ground.

The hinge-away body feature of this invention makes it possible for the trailer's overall interior volume to be increased approximately 5 times.

Although the trailer of this invention has been described in detail, it is understood that various changes in form proportions and minor details of construction may be resorted to within the scope of the appended claims, in which I claim:

1. A foldable camping trailer comprising a wheel supported base panel, a container body hinged near one end thereof to one end of the said base panel, a container cover hinged to the other end of the said container body, a fabric panel connected between the container body and base panel to limit swinging movement about the first mentioned hinge; a second fabric panel connected between the container body and container cover to limit swinging movement about the second mentioned hinge, latch and spring means interconnecting said base panel and container body and operable to initiate upward movement of said container body and cover with respect to said base panel, and an opening in the container body to permit passage, when the camper is expanded between the enclosure formed by the container body and cover and the enclosure formed under the fabric connecting the container body and base panel.

2. A foldable camping trailer as in claim 1, said container body and cover forming an inverted V-structure when the camper is expanded, the said fabric between the container body and top forming a floor, and other panels forming end walls.

References Cited by the Examiner

UNITED STATES PATENTS 2,826,210    3/1958    Heil ---------------- 135—4

FOREIGN PATENTS 225,041    12/1962    Austria.
1,289,422    2/1962    France.

BENJAMIN HERSH, *Primary Examiner.*

P. GOODMAN, *Assistant Examiner.*